US008566069B2

(12) United States Patent
Pauget et al.

(10) Patent No.: US 8,566,069 B2
(45) Date of Patent: Oct. 22, 2013

(54) METHOD FOR GEOLOGICALLY MODELING SEISMIC DATA BY TRACE CORRELATION

(75) Inventors: Fabien Pauget, Prades-le-Lez (FR); Sebastien Lacaze, Montpellier (FR); Thomas Valding, Montpellier (FR)

(73) Assignee: ELIIS, Casteinau le Lez (FR)

( * ) Notice: Subject to any disclaimer, the term of this patent is extended or adjusted under 35 U.S.C. 154(b) by 238 days.

(21) Appl. No.: 13/133,368

(22) PCT Filed: Dec. 9, 2009

(86) PCT No.: PCT/FR2009/052465
§ 371 (c)(1),
(2), (4) Date: Jun. 7, 2011

(87) PCT Pub. No.: WO2010/067020
PCT Pub. Date: Jun. 17, 2010

(65) Prior Publication Data
US 2011/0246157 A1    Oct. 6, 2011

(30) Foreign Application Priority Data
Dec. 10, 2008  (FR) .................................. 08 58439

(51) Int. Cl.
G06G 7/48    (2006.01)
(52) U.S. Cl.
USPC ............................................. 703/6; 702/16
(58) Field of Classification Search
USPC .................... 703/5, 10, 6; 367/14, 53, 72, 73; 702/6–11, 14, 16
See application file for complete search history.

(56) References Cited

U.S. PATENT DOCUMENTS

| | | | | |
|---|---|---|---|---|
| 3,688,249 A * | 8/1972 | Backus et al. | .................. | 367/62 |
| 5,056,066 A | 10/1991 | Howard | | |
| 5,991,237 A * | 11/1999 | de Bazelaire | .................... | 367/50 |
| 6,721,661 B2 * | 4/2004 | Anstey et al. | ..................... | 702/8 |
| 8,213,261 B2 * | 7/2012 | Imhof et al. | ..................... | 367/38 |
| 8,219,322 B2 * | 7/2012 | Monsen et al. | ................. | 702/16 |
| 2004/0062145 A1 | 4/2004 | Dunn et al. | | |
| 2004/0260476 A1 | 12/2004 | Borgos | | |
| 2005/0171700 A1 | 8/2005 | Dean | | |

OTHER PUBLICATIONS

Tracy J. Stark, Generation of a 3D Seismic "Wheeler Diagram" From a High Resolution Age Volume, Society of Exploration Geophysicists, 2005 SEG Annual Meeting, Nov. 6-11, 2005, Houston, Texas.*
Tracy J. Stark, Relative geologic time (age) volumes-Relating every seismic sample to a geologically reasonable horizon, Society of Exploration Geophysicists, 2004.*
N. Bienati et al.: "Horizon picking for multidimensional data: an integrated approach" SBGF, Aug. 1, 1999, p. 1-2.

* cited by examiner

*Primary Examiner* — Mary C Jacob
(74) *Attorney, Agent, or Firm* — Andrew W. Chu; Craft Chu PLLC

(57) ABSTRACT

The present invention relates to a method for developing a geological model from previously collected seismic data, including the steps of: sampling seismic data according to at least one set of traces of a predetermined gradient, each of which have sampling points; analyzing similarities between the seismic data around sampling points; determining connections between sampling points that belong to different traces on the basis of analysis; and forming a geological model that attributes, to each sampling point, a relative geological age that is calculated at least on the basis of connections related to the sampling points and the relative geological age of other sampling points in the vicinity of the trace that includes the sampling point.

15 Claims, 6 Drawing Sheets

(a)

(b)

(c)

(d)

METHOD FOR GEOLOGICALLY MODELING SEISMIC DATA BY TRACE CORRELATION

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to a method for automatically developing a geological model from seismic data. It finds particularly relevant applications in the field of the analysis of seismic data, namely during the search for new oil fields.

2. Description of Related Art Including Information Disclosed Under 37 CFR 1.97 and 37 CFR 1.98.

Generally, the seismic data represent a subsoil and therefore permit to apprehend the geological structure of the covered area. A seismic signal typically represents the derivate of the acoustic impedance of the layers through which pass sound pulses emitted during the acquisition of said seismic data. Therefore, the seismic line is an indirect and degraded representation of the underlying geology. Indirect because the value of the pixel is not representative of the very nature of the subsoil at that point, and degraded because the final data are the result of a chain of processing operations (deconvolution, <<stacking process>>), which introduce artifacts and approximations. Therefore, the reconstruction of the geology from the seismic data generally requires complex analysis means, which try to identify the geological layers one by one and independently from each other. The existing analysis methods use as a postulate that one and the same geological layer has similar seismic signatures. The surfaces are thus extracted through propagators that start from a germ, or by means of classifiers (Kmean) that group the seismic signatures having the same gauge. The main limitation of these techniques results from the basic postulate itself, which is never really maintained. In addition, the algorithms used have many drawbacks: too strong influence of the germ, drifts of the propagations, invalid surfaces connecting various geological stages, etc.

More recently global approaches appeared, which aim to calculate, during one and the same process, the whole geological model directly from the seismic data. Among these methods, two large families can be distinguished: those using the local gradient of the layers and those using primitives.

In the family of methods using the local gradient of the layers, namely U.S. Pat. No. 6,771,800 belonging to Keskes et al. (2002) is known, which is based on the propagation of 2D lines in the direction of the gradient. This technique works only in 2D and produces no interruptions of continuities of the geology.

Also known is the paper by Lomask et al., <<Flattening without picking>>, Geophysics vol. 11 no. 4, 2006, pp. 13-20, which provides a method for compensating for the gradients by means of an iterative minimization process. During this process, the gradients, obtained by calculating the 3D gradient on each seismic point, are gradually eliminated, until a flat seismic block, without global deformations, is obtained, which permits to reveal the sedimentation rates by means of a stratigraphic analysis. This technique works in 3D, but the management of the interruptions of the model requires an a priori knowledge of the discontinuities.

In the family of methods using primitives as basic elements of the geological model, these elements are, in a first step, extracted from the seismic image and are then arranged with respect to each other so as to construe the model.

In the method described by Monsen et al., namely in US 2008/0140319, the primitives are varying-size geological surfaces obtained automatically by propagation on the extrema of the seismic line. These primitives are then sorted by topological order based on an acyclic graph (<<Directed Acyclic Graph>>, DAG), which represents the superposition relationships between the primitives. The topological order assigned to each surface permits to construe the geological model. This method works in 3D, it manages the erosion-like discontinuities, but does not permit to automatically manage the faults.

A variant of this approach is provided by Verney et al. in <<An Approach of Seismic Interpretation Based on Cognitive Vision>>, 70th EAGE Conference & Exhibition—Rome, Italy, 9-12 Jun. 2008. In this document, the relationships between mini-surfaces are hierarchized depending on their mean vertical distance and the fusion criteria between primitives are based on principles from the cognitive science.

In the present context of an increasingly more competitive and expensive oil market, the search for new fields requires the use of more accurate and quicker automatic analysis tools. The object of the present invention is a method working at the scale of the seismic point for automatically developing a geological model from seismic data, which can automatically manage the geological discontinuities such as the faults, and which permits to implement multi-scale strategies.

SUMMARY OF THE INVENTION

This object is achieved with a method for developing a geological model from previously collected seismic data, characterized in that it comprises steps of:
  sampling said seismic data according to at least one set of traces of a predetermined gradient, each consisting of sampling points,
  analyzing similarities between the seismic data around said sampling points,
  determining connections between sampling points belonging to different traces on the basis of said analysis, and
  forming the geological model attributing to each sampling point a relative geological age, which is calculated at least on the basis of connections associated with said sampling point and the relative geological age of the other sampling points in the vicinity of the trace that includes said sampling point.

According to a mode of implementation, the method according to the invention can comprise steps of:
  sampling said seismic data according to at least one set of seismic traces each formed of sampling points sampled according to increasing depths,
  analyzing similarities between the seismic data around said sampling points belonging to different seismic traces,
  determining connections between sampling points belonging to different traces on the basis of said analysis of similarities, which connections connect points located substantially on one and the same geological surface, and
  forming said geological model attributing to each sampling point a relative geological age, which is calculated at least on the basis (i) of the relative geological age of other sampling points connected to said sampling point by connections, and (ii) of the relative geological age of other sampling points in the vicinity of the trace that includes said sampling point.

The method according to the invention thus permits to develop a geological model from an arbitrary sampling grid of the seismic data, using the local similarities of the data. In particular, it is not based on the detection of extrema and the propagation of surfaces from these extrema like the prior art methods, but it permits a finer modeling of all the data.

The method can in addition advantageously comprise a step of filling the geological model through propagation of a mini-surface by similarity in the vicinity of each sampling point that comprises a connection, taking said point as a germ.

These mini-surfaces should however not be mistaken for the surfaces propagated as primitives in prior art methods. Indeed:

they are used only to complete the geological model and, in particular, the existing topological relationships between them are not used, the shape of their contour and their size are essentially determined by the sampling grid, and because of their very small surface, the problems of drifts related to the propagation algorithms are negligible.

The data of a seismic volume can be sampled in a substantially horizontal plane according to a mesh substantially with any of the following shapes: rectangular, hexagonal, and the traces can have a substantially vertical orientation and comprise substantially equidistant sampling points.

The determination of the connections between sampling points belonging to different traces can advantageously comprise a step of calculating correlation images, each correlation image corresponding to a couple of traces, trace being represented according to a dimension of the correlation image, and the value of each point of the image representing the local correlation of the seismic data in the vicinity of the respective two points of each trace.

The method according to the invention can comprise in addition steps of:

forming segments in the correlation image by propagation among the points corresponding to correlation values higher than at least a predetermined threshold, which segments correspond to sets of connections or combs of correlations between sampling points of the traces;

selecting segments of the correlation image, which selection leaving at most only one segment per line and per column of the correlation image, corresponding to only one connection per sampling point, and the segments being selected based on the value of the points forming them, and on their length; and validating the connections through analysis of the paths formed by the successions of points connected by said connections, a condition for the connections to be validated being that, in a seismic volume, the paths are in a loop.

The steps of selection of segments in a correlation image and validation of the connections can advantageously be iteratively repeated on the segments remaining in the correlation image, using as a constraint the connections validated at the preceding iterations, until there remains no longer any usable segment.

The attribution of a relative geological age to the sampling points can advantageously be an iterative process performed as long as there remain undated sampling points that comprise at least one connection, which comprises steps of:

selecting an undated sampling point that comprises at least one connection, attributing a relative age to this point, taking into consideration already dated points of its trace, so that the age along a trace always varies in the same direction, and attributing the same relative age to all the points connected to this point by connections.

The method according to the invention can comprise in addition a step of normalizing the relative ages, the age increment between consecutive relative age points being fixed at a predefined value.

According to another aspect of the method according to the invention, a multi-scale geological model can be developed by combining sets of connections between sampling points, which sets of connections are obtained with different sampling grids.

The method according to the invention can advantageously be applied in an automated way, namely:

to the direct extraction of the settling surfaces based on iso-values, to the horizontalization of the seismic line by mapping on a line or a plane the seismic signal corresponding to a geological stage, to the analysis of faults, and to the analysis of channels.

According to another aspect of the invention, a computer program is provided, which implements the method according to the invention.

BRIEF DESCRIPTION OF THE DRAWINGS

Further advantages and features of the invention will become clear when reading the detailed description of implementations and embodiments, which are in no way restrictive, and the following attached drawings.

FIG. 1a shows the vertical sampling of the data in seismic traces, while FIG. 1b shows the construction of the correlation image.

FIGS. 2a and 2b are illustrations, wherein FIG. 2b shows the correlation comb corresponding to a geology referred to as iso-pack with gradient variations as shown in FIG. 2a.

FIGS. 3a and 3b are illustrations, wherein FIG. 3b shows the correlation comb corresponding to a geology having both gradient and thickness variations as shown in FIG. 3a.

DETAILED DESCRIPTION OF THE DRAWINGS

The method according to the invention uses a set of seismic data to deduce from same a geological model, this while working at the scale of the seismic points.

The data as described in the preferred embodiment refer to a cube or 3D volume of seismic data. The method according to the invention can however also be implemented on a two-dimensional set of seismic data, such as cross-sections.

The volume of seismic data can be characterized by 3 axes, i.e. Inline and Xline axes, respectively, substantially parallel to the surface of the ground and a TWT axis oriented in the direction of the increasing depths.

Figure 1:
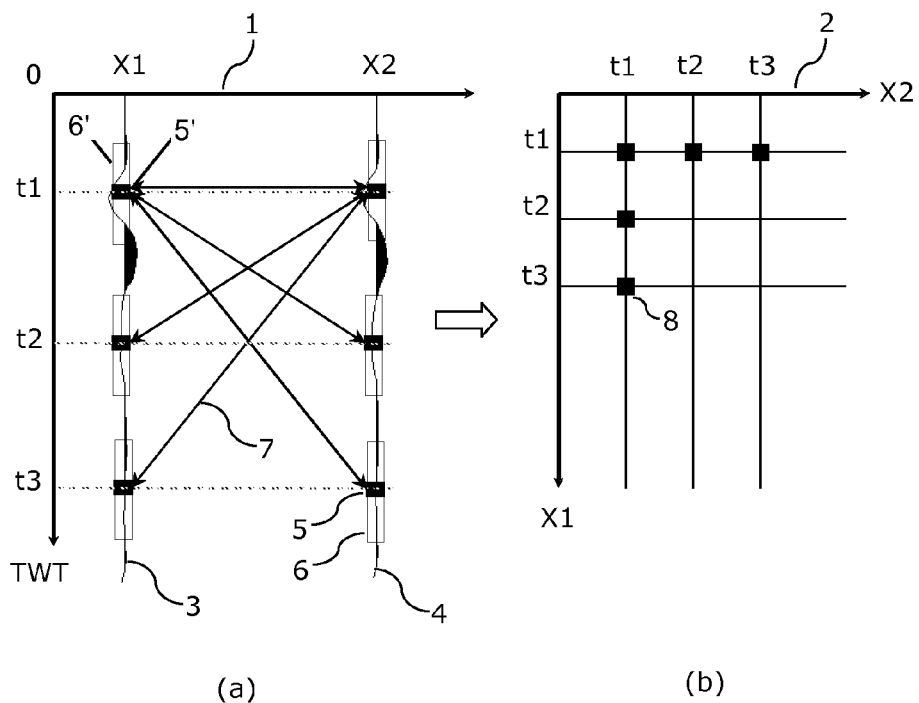
FIG. 1 shows a graph illustration of the construction of the correlation image corresponding to two traces of all the seismic data.
Figure 6:
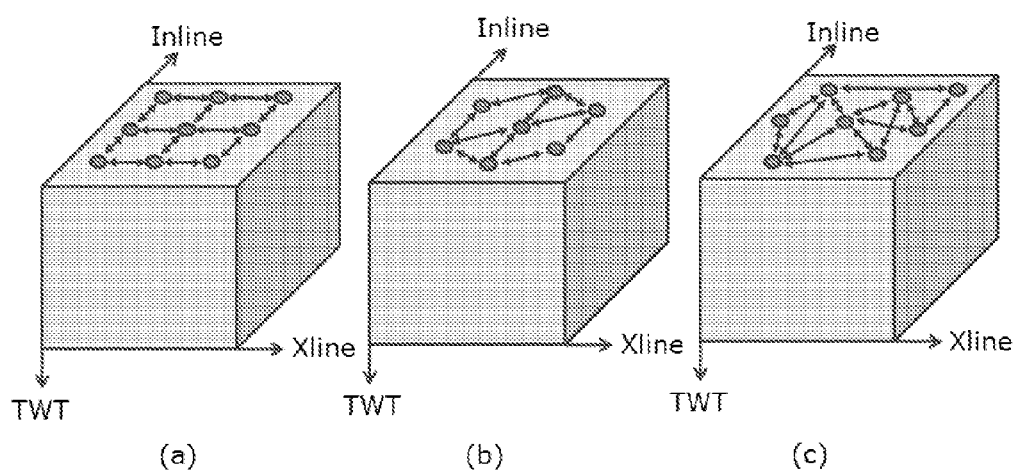
FIG. 6 shows schematic illustrations of exemplary strategies for sampling the seismic cube.

The method according to the invention can be applied to all the data of the seismic volume, but, in the general case, it is enough to limit oneself to a subset of sampled points, in order to limit namely the time of calculation. When referring to FIG. 1, a seismic trace, or trace 3, 4, comprises a set of points 5 substantially aligned and equidistant, sampled at the depths t1, t2, t3, etc., in the direction of the TWT axis. The total seismic volume can be sampled by a set of traces arranged in the Inline-Xline plane according to a for example square, hexagonal, even arbitrary mesh, as shown in FIG. 6.

When referring FIG. 1a, a first step of the method according to the invention consists in calculating, for a set of pairs of traces (3, 4) of interest extracted from the seismic data 1, a correlation image 1(X1, X2), X1 and X2 being the respective positions of the seismic traces 3, 4. This correlation image 2 in FIG. 1b represents all the correlation coefficients calculated between the N1 points proceeding from X1 and the N2 points proceeding from X2. In this image with dimensions (NI*N2) pixels, if X1 is on the ordinate and X2 on the abscissa, the value of point P(i, j) located in column i and on line j is the correlation coefficient Cf(i, j) calculated between the i-th point of trace X2 and the j-th point of trace X1.

The correlation coefficients Cf(i, j) can be calculated for example based on the correlation of a mini-trace Vi of the size S, centered around a point X2(i) and a seismic mini-trace Vj of the size S centered around a point X1(j). The mode of calculating the coefficients Cf(i, j) can also, and non-restrictively, comprise any type of calculation of the distance or differences between the two vectors Vi and Vj.

In FIG. 1a, for example, the value of point 8 of the correlation image 2 is the result of the calculation of the correlation between the mini-trace 6 around point 5 having the position t3 in the trace X2 with the mini-trace 6' around the point 5' having the position t1 of trace X1. According to a non-restrictive convention, the mode of calculating the value of the points of the correlation image 2 is defined so that this value increases with the similarity of the vectors Vi and Vj.

Each point of the correlation image I(X1, X2) such as 8 thus corresponds to a connection, for example 7, between a point of the trace X1 and a point of the trace X2. A point that has a high value in I(X1, X2) represents a connection with a high probability between X1 and X2. The correlation image thus shows all the high-probability connections between two seismic traces. When referring to FIG. 2b, when the high-probability points are contiguous in the correlation image 2, their relevancy increases, because they are no longer isolated within the geological context, but form a consistent set 10 that connects two geological stages. These contiguous sets correspond to correlation combs 11 in the space of the data 1, which combs are defined by the sets E of points P(i, j) of the image I(X1, X2) such that no point P(i j) of E has neither the same abscissa nor the same ordinate as one of the other points of E. This property represents the fact that, in a given comb, a seismic point is connected only to one single connection.

In the case of a fully laminar geology with a zero gradient, the traces X1 and X2 are similar and the segment with the highest correlation is located on the diagonal of the image 2, with a leading coefficient substantially equal to 1. The resulting comb then comprises horizontal connections.

Figure 2:
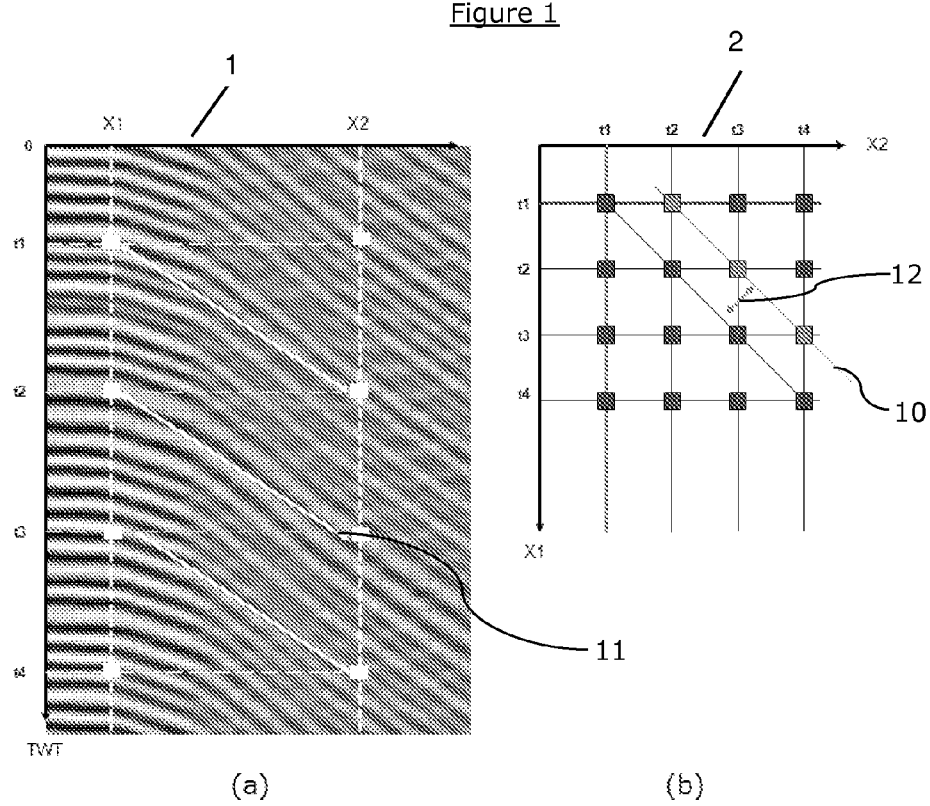

In the case of a geology referred to as iso-pack with gradient variations as shown in FIG. 2a, the two traces X1 and X2 have similar signatures, but are shifted. The segment with the highest correlation 10 is then parallel to the diagonal, with a leading coefficient substantially equal to 1, and the distance 12 between the diagonal and the segment represents the value of the rejection, i.e. of the shift along the TWT axis, between X1 and X2.

Figure 3:
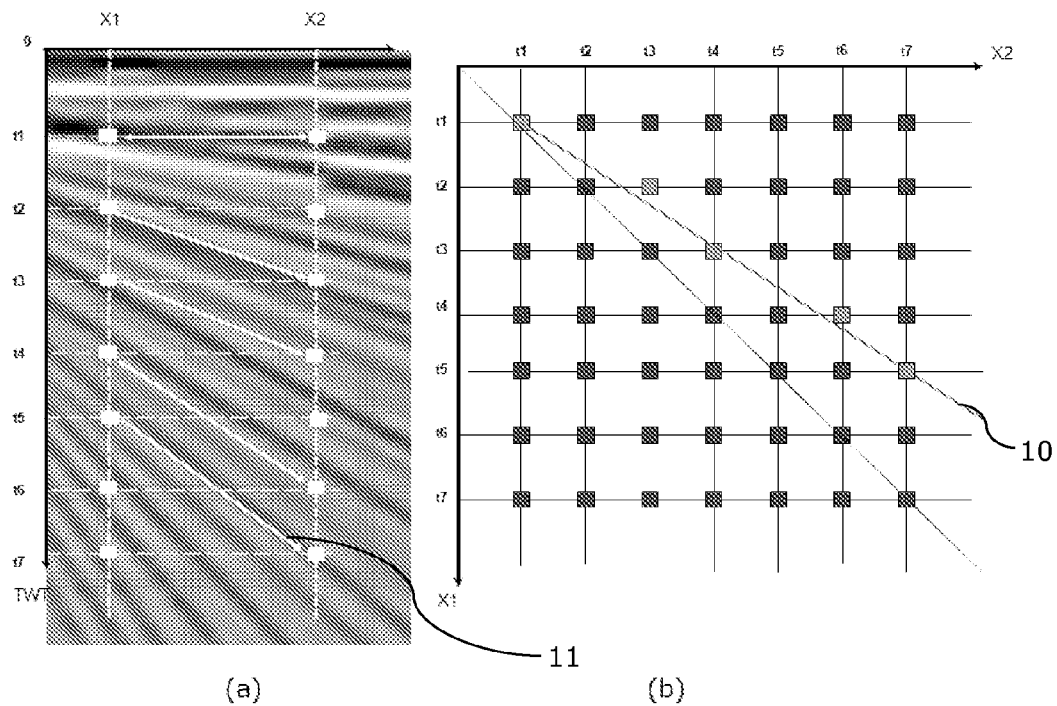

Likewise, in the most general case, in which the geology has variations both in gradient and in thickness, as shown in FIGS. 3 and 3b, the segment with the highest correlation 10 (FIG. 3b) possesses a direction coefficient different from 1, because the rejection varies along the comb 11 (FIG. 3a).

Figure 4:
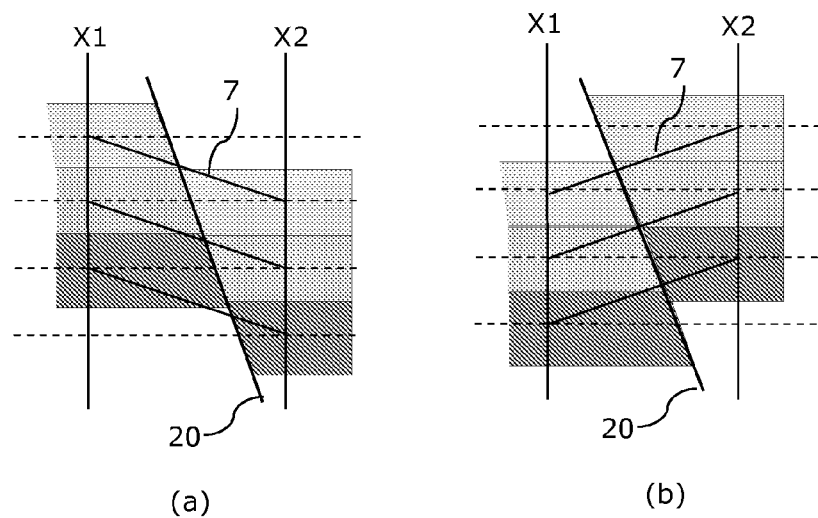
FIG. 4 shows graphic illustrations of the creation of correlation combs between points on both sides of a fault having a normal rejection (FIG. 4a), or vice-versa (FIG. 4b).

Advantageously, the method according to the invention is not sensitive to the presence of faults, in contrast to the propagation methods used in the prior art to obtain seismic surfaces and primitives. By using the correlation-comb method, relationships or connections 7 between the points can be established on both sides of the fault 20, irrespective of the value and the (normal or reverse) direction of the reject, as shown in FIG. 4a (normal) and FIG. 4b (reverse).

Figure 5:
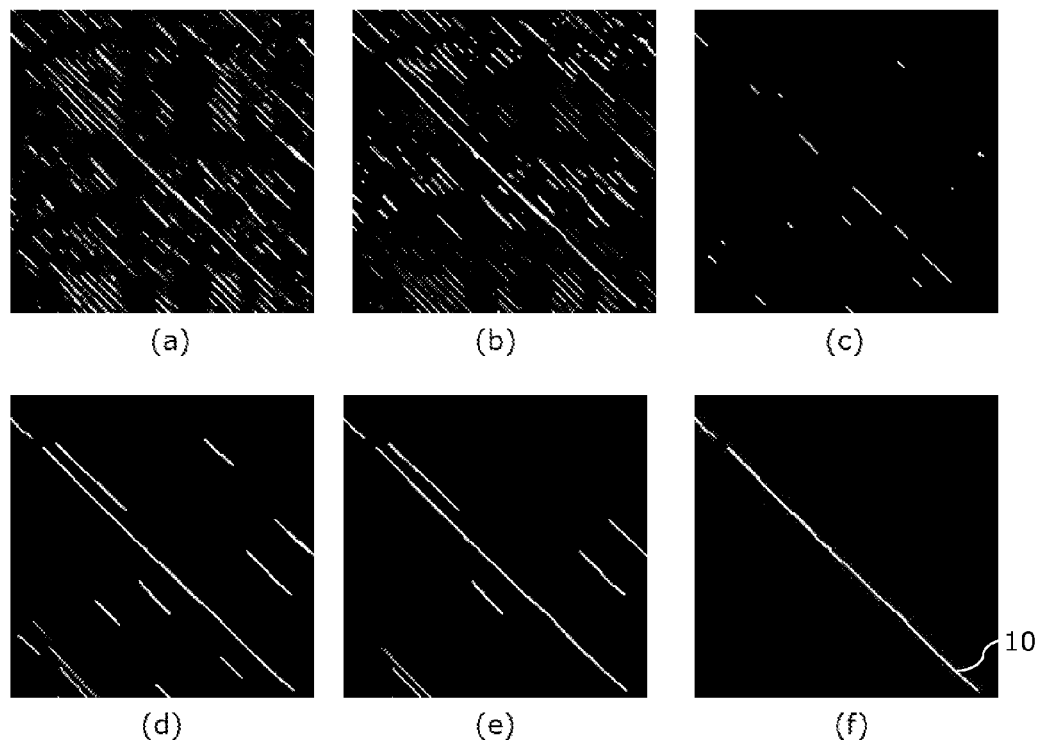
FIG. 5 shows illustrations of a process of extraction of the segments of a straight line with a high intensity in the correlation image.

The combs 11 can be detected automatically by extracting segments of a straight line 10 with a high intensity of the correlation image I(X1, X2). This detection can advantageously be performed for example based on an algorithm comprising the following steps, shown in FIGS. 5a to 5f, respectively:

classifying the points of the image I(X1, X2) into three families : INVALID, VALID and UNCERTAIN depending on their correlation value (FIG. 5a);

using all the points classified as VALID as a germ for propagating the segments. The candidate points for the propagations are only the points classified as VALID and UNCERTAIN (FIG. 5b);

searching all the points of I(X1, X2) that have the maximum value on a line or on a column. These points are marked as MAXP (FIG. 5c);

eliminating the segments that contain no point marked as MAXP (FIG. 5d);

eliminating the segments the length of which is smaller than the median length of the segments obtained in the preceding step (FIG. 5e); and presenting each segment starting from the longest to the shortest one. Each presented segment eliminates all the segments that have a point on the same line or on the same column of the correlation image (FIG. 5f). The longest segment 10 corresponding to the longest comb 11 is thus obtained, while ensuring that the seismic points of the comb 11 are associated to one single connection.

In order to detect the combs 11 on all the data of the seismic block, it is necessary to select positions of the pairs of traces X1 and X2 based on which a correlation image is calculated. These traces can be positioned anywhere in the seismic block. When the machine capacities do permit so, all traces of the seismic cube and, hence, all the points can be used. However, a sampling of the seismic cube is generally necessary.

One can advantageously opt for a regular sampling strategy in which one trace out of N possible traces is taken and all the images I(Xi, Xj) are calculated so that the positions Xi and Xj are distant from N, for example according to a substantially square or hexagonal mesh (FIGS. 6a and 6b). A random strategy can also be implemented, in which all the pairs (Xi, Xj) are drawn at random (FIG. 6c). Several strategies can also advantageously be combined, the only aim being to obtain a sufficient number of combs 11 for the essential of the seismic block to be characterized.

The flexibility of use provides a considerable advantage for the method according to the invention, because it permits to easily implement multi-scale, or multi-resolution, strategies by combining for example distant combs of N samples with distant combs of 2*N samples. The use of the combs with several scales or levels of resolution permits to better process for example large-scale geological factors such as fault or erosion areas.

Figure 7:
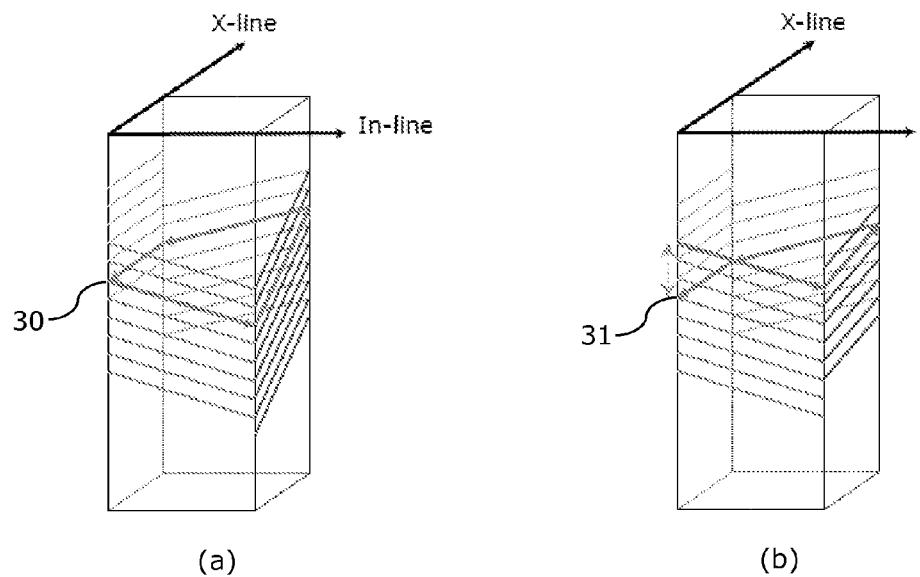
FIG. 7 shows schematic illustrations of the validation of the correlation combs through analysis of the paths.

The method according to the invention can advantageously comprise a step of validation of the connections, based on an analysis of the paths formed by the successions of seismic points connected to each other by these connections. Indeed, in as far as a connection connects by definition points that are located on a same geological surface, by passing over a path link by link, one must normally remain on the same surface. If a path does not form a closed loop, it is rejected, because there is no certainty as regards its relevancy. If a path comprises two different points belonging to a same trace 31, as shown in FIG. 7b, it is also not validated, because it passes through different geological stages along its path. On the other hand, when the path returns to exactly the same starting point 30 without overlapping (FIG. 7a), it is validated, because the likelihood that it is on the same surface is high. When a path is validated, all the connections it is comprised of are also validated. Likewise, when a number of connections are validated in a comb, the whole comb is validated, because it is considered that the combs are indissociable and relevant units.

Although this criterion for validation of the connections is difficult to be met, it permits to fill the seismic space with combs having of geological consistency. With this technique, a valid connection can pass over geological surfaces having strong gradient variations and in which there are faults.

An iterative method can advantageously be implemented in the method according to the invention in order to fill as much as possible the studied seismic volume, so as to elaborate an as complete as possible final model with a maximum of connections. Each iteration of this process comprises a detection, then a validation of a set of combs, as described above. Each new iteration is constrained by the preceding iterations. The seismic space is gradually filled, the number of possibilities of inserting new combs decreases.

Figure 8:
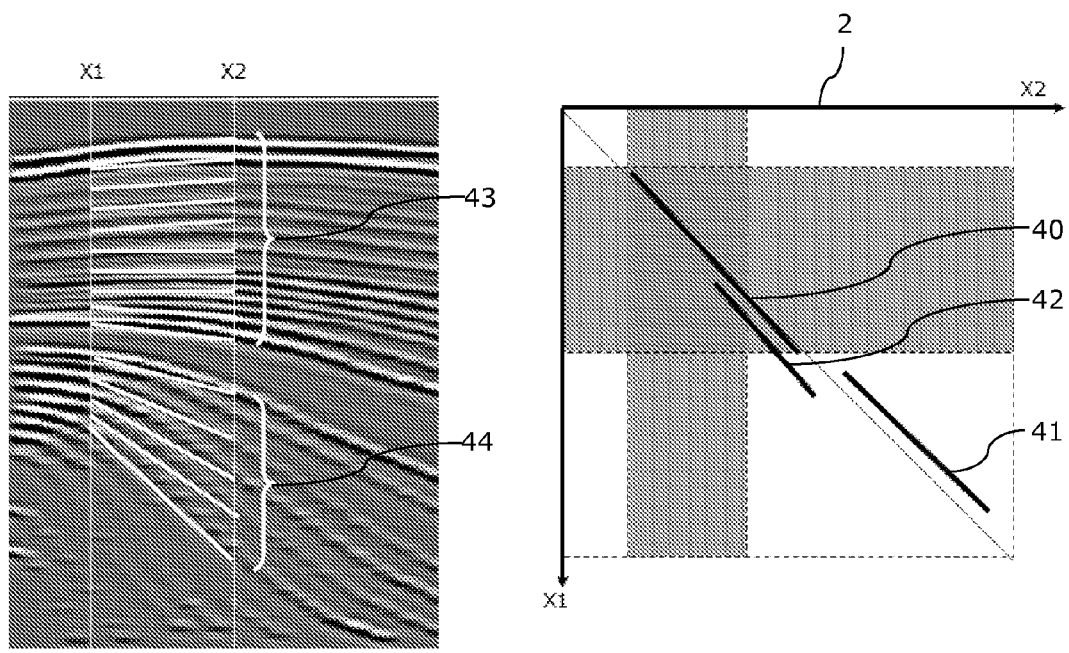
FIG. 8 shows illustrations of the principle of iterative insertion of correlation combs in order to fill the space with the data.

Let's assume a pair (X1, X2) of two traces. When during the first iteration a comb has been validated between X1 and X2, the latter will serve as a constraint for the next iteration because it limits the field of available solutions for a second comb. This principle is shown in FIG. 8. In this figure, the segments corresponding to three relevant combs are present in the correlation image 2. The most obvious segment 40 corresponding to the comb 43 is validated during the first iteration. For the second iteration, the whole portion in grey of the image is no longer available according to the principle, according to which there can be only one connection per pair of points. Therefore, the segment 42, a too large portion of the connections of which overlaps in the area in grey, is eliminated from the list of candidates. Only the segment 41 corresponding to the comb 44 remains available.

The first valid combs are positioned on the good-quality seismic line that has the best correlations. These combs will then serve as a constraint for the second waves of combs, during the second iteration, which will use the available space with a seismic wave having a less good quality. Thus, the geological constraint brought by the existing connections will gradually be enriched, so as to compensate for the gradual loss of quality of the seismic line that remains unprocessed. Advantageously, the space is gradually covered, even in the areas having a low signal/noise ratio. A condition for stopping the iterative process can be, for example, the absence of new detected combs.

The method according to the invention thus permits to fill the space with the data of correlation combs connecting the points of the pairs of traces (Xi, Xj). Let's assume that Ep is all the seismic points located on all the pairs (Xi, Yj). Advantageously, it is possible to assign to each point P of Ep a reference position calculated with the validated connections and which represents the position of P in the geological context. This reference position permits to establish a hierarchy of points P, from the youngest to the oldest one. This calculation can occur for example based on the following algorithm:

```
ValRef(P) = reference value for a point P
Step is the increment of the position values, for example Step = 1
(Initialization)
For all the points P, do
    P = UNMARKED
    insert P into GlobalStack.
ValRef(P) = 0.
End of do
(Calculation of the positions)
Extract GlobalStack in nextP
As long as nextP exists, Do
    P = nextP
    nextP = UIMKIMOW
Insert P into LocalStackI and into LocalStack2
minValRef = UNDEFINED and maxValRef = UNDEFINED
As Long As LocalStackI is not empty Do
Pop LocalStackI in K
If nextP =UNKNOW Then
    Search for PAbove the first UNMARKED point located above K
    Search for PBelow the first UNMARKED point located below K
If PAbove exists, then nextP = PAbove
If PBelow exists, then nextP = PBelow
End If
    Search for PAboveMark the first MARKED point located above K
    Search for PBelowMark the first MARKED point located below K
If PAboveMark exists and if ValRef(PAbove)>minValRef, then
minValRef = ValRef (PAbove)
If PBelowMark exists and if maxValRef = ValRef (PBelow)
For all the points V that are UNMARKED connected to K by a connection
Do
    V = MARKED
    insert v into LocalStackI and into LocalStack2
End For
End As Long As
If minValRef = UNDEFINED and maxValRef = UNDEFINED, then
minValRef = 0 and maxValRef = 0
If minValRef=UNDEFINED and maxValRef different from UNDEFINED
then minValRef = maxValRef- 2*step
If maxValRef = UNDEFINED and minValRef different from
UNDEFINED then maxValRef = minValRef + 2*step
As Long As LocalStack2 is not empty, Do
Extract LocalStack2 in K ValRef(K) = (maxValRef + minValRef)/2.
End As Long As
If nextP = UNKNOW, do
As long as nextP = UNKNOW do
Extract GlobalStack in P
If P = UNMARKED, then nextP = P
End As Long As
End If
End As Long As
```

Figure 9:
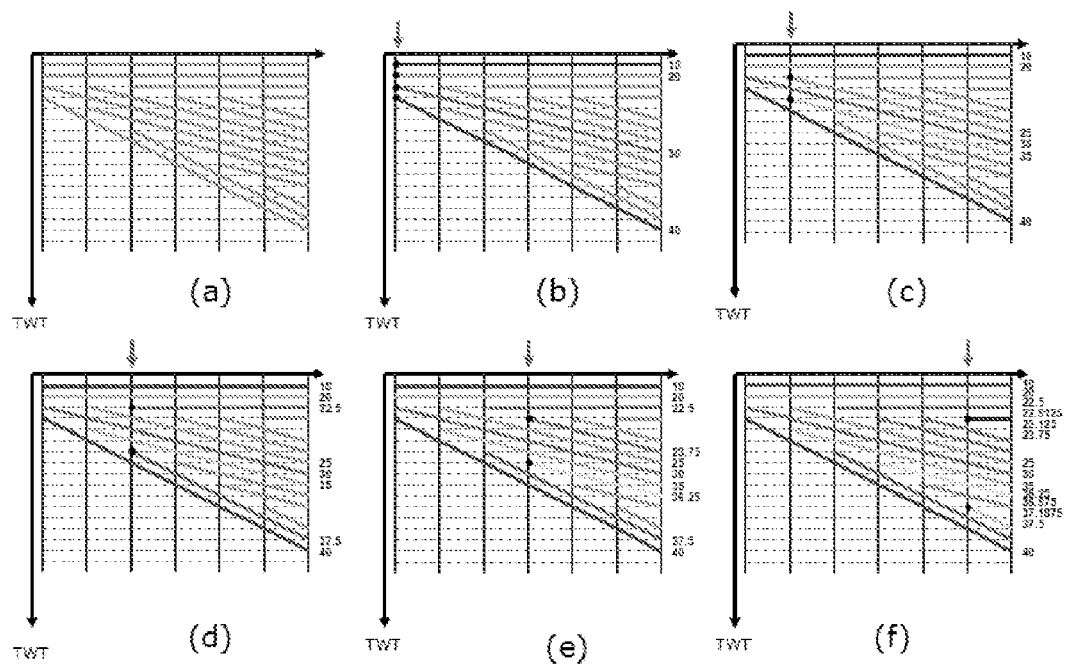
FIG. 9 shows graphic illustrations of an example of application of the algorithm for calculating the reference positions.

This algorithm is quick, since each point P is visited only once. FIG. 9 shows the process for calculating the reference positions in a case where the thickness varies from right to left. In this example, the increment pitch is equal to 10. The figure shows respectively (a) all the connections in the case of a variation of the thickness, (b) the initialization of the positions on the first trace with an increment of 10 (c, d, e and f), the calculation of the relative positions on each one of the virgin connections, with respect to the lower and upper connections.

The reference positions form an arbitrary time scale in which the points of the seismic line are positioned with respect to each other. Advantageously, it is possible, by passing through this time scale from the most recent to the oldest, to normalize the relative age of the points so that the change in positions between two consecutive points on the time scale is constant.

At this point, only part of the points of the seismic line possess a reference position: this is the set Ep of the points that comprise a valid connection. The number of points depends on the number of correlation combs detected, which in turn depends on the sampling performed for positioning the pairs of traces (X1, X2). In order to fill the whole seismic space with reference positions, small surfaces the shape and the topology of which depend on the seismic signal and the type of sampling that has been chosen can advantageously be construed. Each point referenced in Ep can serve as a germ G for calculating a mini-surface based on a traditional propagation algorithm by similarity of seismic mini-trace. The spatial extension of this mini-surface is advantageously limited to the <<Voronoi cell>> associated with the germ G. The definition of a Voronoi cell is as follows: Let's assume that E is a set of points and S a subset of E (S is a sampling of E). If P is a point of S, the Voronoi cell associated with the point P is all the points present in E that are closer to P than to all the other points of the subset S.

In the case of the method according to the invention, the set E can represent all the points of the surface of the seismic block and S the positions of the traces Xi, used for calculating the correlation images.

Advantageously, to all the points of a mini-surface propagated from a germ G is assigned the reference position associated with G. This technique permits to fill the whole space while maintaining the variations of the local gradient. It should be noted that, in contrast to the prior-art methods, the method is not limited to the extrema of the seismic line, but a mini-surface is created for each point comprising a valid connection. Likewise, in comparison with the prior-art methods that use propagated surfaces as primitives, the mini-surfaces calculated in the method according to the invention have very particular features:
- the shape of their contour and their size are essentially determined by the sampling grid,
- because of their very small surface, the problems of drifts connected to the propagations are negligible, and
- they are used only to complete the model, and in particular the topological relationships existing between them are not used.

Figure 10:
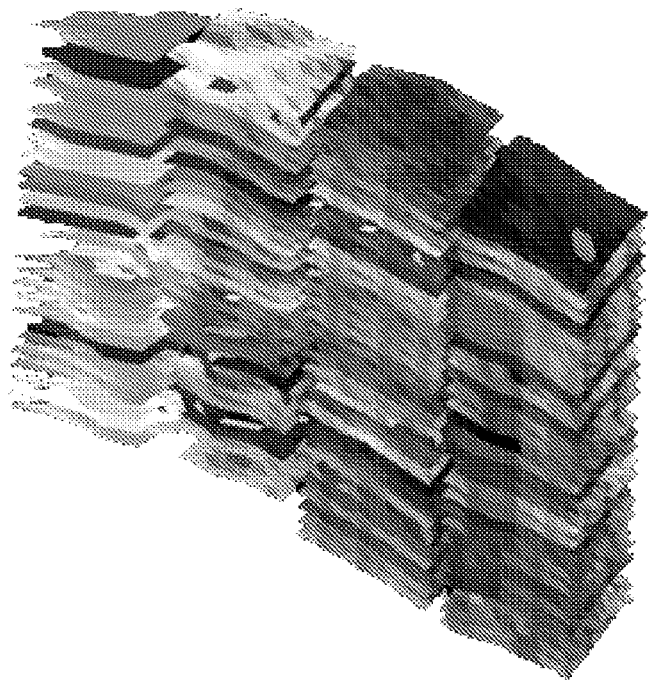
FIG. 10 shows an illustration of an example of mini-surfaces obtained in a square sampling grid.

FIG. 10 shows an example of mini-surfaces obtained in a square sampling grid.

Figure 11:
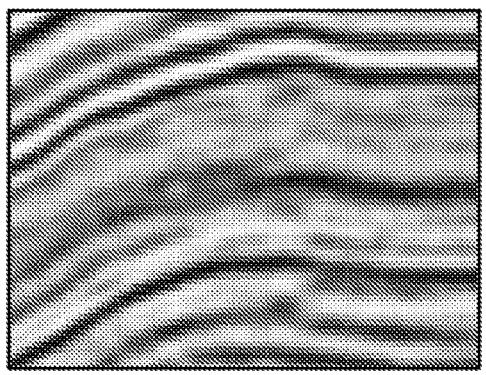
FIG. 11 shows illustrations of the filling of the geological model.
Figure 11:
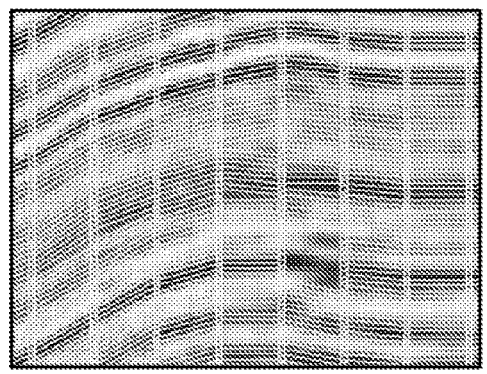
Figure 11:
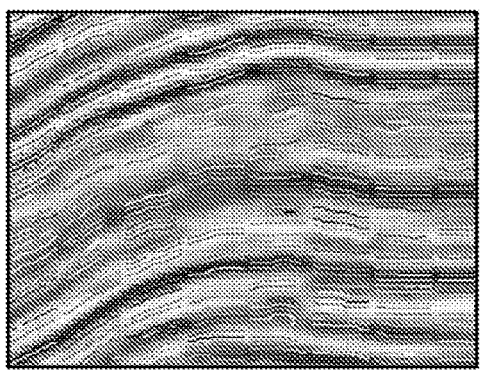
Figure 11:
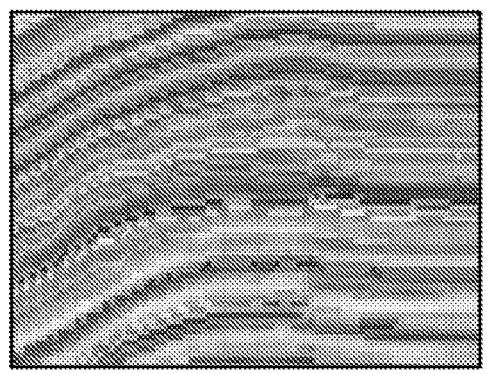

The filling of the geological model is shown in FIG. 11, (a): seismic image, (b): all the validated connections, (c): mini-surfaces propagated from the points connected to the validated connections, (d): reference positions obtained for each point of the image (a).

Accordingly, there are advantageous features of the method according to the invention.

The models obtained are very accurate, because the reference primitives are the seismic points. In the prior-art methods, which use surfaces as primitives, the real modeling is possible only on the extrema, the rest of the information being obtained by vertical interpolation between the extrema. In the method according to the invention, no interpolation is required, which permits less approximation and, hence, more accuracy.

In the prior-art approaches based on primitives, a surface is indivisible, it is a set of indissociable points that always have the same value in the geological model. This rigidity eliminates any possibility of controlling the model within one and the same surface. The quality of the model thus depends on the quality of extraction of the primitives. In the method according to the invention the model can be constrained at any point of the seismic space by simply adding a connection. The model maintains its full flexibility and the control can be performed without any restriction.

It can be interesting to combine several analysis scales in the interpretation of the seismic data. For example, a local analysis focused on the small variations of the seismic signal can be mixed with a more global analysis relating to the large events such as the high rejections of faults or changes in thickness. With the prior-art methods for modeling, the use of several scales within one and the same calculation is very difficult to be implemented, in contrast to the method according to the invention in which it is enough to cause the distances between the traces on which the correlation images are calculated to vary.

The correlation combs used in the method according to the invention can find connections between the geological layers located on both sides of the faults and this irrespective of the amplitude and the direction of the rejection. The method according to the invention thus permits to better control the geological discontinuities than the other prior-art methods depending on a local analysis such as the propagation or the local calculation of the gradient.

The method according to the invention can advantageously be applied to automatic analyses of geological parameters.

There is the direct extraction of the settling surfaces based on iso-values. The method according to the invention permits an important time gain, because it permits to omit the manual extraction process by means of a plane on which a fixed point of origin has been selected, which is extremely long and tedious. The surfaces obtained are a very rich source of information, because they constitute the fundamental and first element for many systems and methods for analyzing the geology.

Also, there is the horizontalization of the seismic line, which consists in mapping on a line or on a horizontal plane the seismic signal corresponding to a geological stage. By thus processing several successive stages, one manages to reconstruct a so-called straightened seismic line in which all the reliefs of the geological settlements are smoothed. The method according to the invention is advantageously implemented for this type of applications, very often used namely in the search for hydrocarbons, because the relief of each surface is then known, with in addition a very good accuracy and a high reliability.

Furthermore, there is the analysis of the faults which are slides of the geological layers along a fracturing surface. This fracturing generates an interruption of continuity of the geological settlements, which, in the seismic field, results into a perturbation of the signal. Thus, in the resulting image of geological modeling the presence of a fault will results into sudden changes of the topological values, which occur along surfaces. These two criteria make possible the extraction of faults in the form of vectored surfaces and also the mapping of the amplitude of the rejection along the faults.

Also, there is the analysis of the channels, which are old beds of land or sea rivers filled with settlements. In oil exploration, these channels constitute privileged targets, because they have all the features of the hydrocarbon traps. The phenomena of digging and filling flow beds are quick at geological scale and result, in the image of geological modeling obtained by applying the method according to the invention, into sudden changes in thickness of the geological stages in the form of lenses. These morphological features are rather discriminating to contemplate an automatic tri-dimensional mapping of the channels.

Of course, the invention is not limited to the examples that have been described and many modifications can be made to these examples without departing from the framework of the invention.

We claim:

1. Method for developing a geological model from previously collected seismic data, the method comprising the steps of:
    sampling seismic data according to at least one set of seismic traces, each trace being comprised of sampling points sampled according to increasing depths, the traces further having a substantially vertical orientation and being comprised of substantially equidistant sampling points;
    analyzing similarities between the seismic data around said sampling points belonging to different seismic traces;
    determining connections between sampling points belonging to different traces on a basis of analysis of said similarities, the connections connecting sampling points located substantially on same geological surface; and
    forming said geological model attributing to each sampling point a relative geological age, being calculated at least on a basis of:
        (i) relative geological age of other sampling points connected to said each sampling point by connections; and
        (ii) relative geological age of other sampling points in a vicinity of a trace corresponding to said each sampling point.

2. Method according to claim 1, further comprising the step of:
    filling said geological model through propagation of a mini-surface by similarity in a vicinity of each sampling point comprising a connection, by taking said each sampling point as a germ.

3. Method according to claim 1, wherein data of a seismic volume are sampled in a substantially horizontal plane according to a mesh having substantially any shape selected from a group consisting of: rectangular, and hexagonal.

4. Method according to claim 1, wherein determination of the connections between sampling points belonging to different traces comprises the step of:
    calculating correlation images, each correlation image corresponding to a pair of traces, each of said pair of traces being represented according to a dimension of the correlation image, a value of each point of each correlation image representing a local correlation of seismic data in a vicinity of two respective points of each of said pair of traces.

5. Method according to claim 4, further comprising a step of:
    construing segments in the correlation image through propagation among points corresponding to correlation values higher than at least a predetermined threshold, the segments corresponding to sets of connections or correlation combs between sampling points of the traces.

6. Method according to claim 5, further comprising a step of:
    selecting segments of the correlation image,
    wherein a selection leaves at most only one segment per line and per column of the correlation image, corresponding to one single connection per sampling point, and
    wherein the segments are selected on a basis of value of points and length.

7. Method according to claim 6, further comprising a step of:
    validating the connections through analysis of paths formed by successions of points connected by the connections, a condition for the connections to be validated being that the paths form a closed loop in a seismic volume.

8. Method according to claim 7, further comprising:
    iteratively repeating the steps of selecting segments in the correlation image and validating the connections on remaining segments in the correlation image, by using as a constraint the connections validated in preceding iterations, until there are no longer usable segments.

9. Method according to claim 1, wherein attribution of a relative geological age to the sampling points is an iterative process performed as long as there remains an undated sampling point comprising at least one connection, the method further comprising the steps of:
    selecting an undated sampling point comprising at least one connection;
    attributing a relative age to said undated sampling point, taking into consideration already dated points of a trace of said undated sampling point, so that age along a trace always varies in a same direction; and
    attributing a same relative age to all points connected to said undated sampling point by connections.

10. Method according to claim 9, further comprising a step of:
    normalizing relative ages, an age increment between points of consecutive relative ages being fixed at a predefined value.

11. Method according to claim 1, wherein a multi-scale geological model is developed by combining sets of connections between sampling points, wherein sets of connections are obtained with different sampling grids.

12. Method according to claim 1, being applied to direct extraction of settling surfaces on a basis of iso-values.

13. Method according to claim 1, being applied to horizontalization of a seismic line by mapping a seismic signal corresponding to a geological stage on a line or on a plane.

14. Method according to claim 1, being applied to analysis of faults.

15. Method according to claim 1, being applied to analysis of channels.

* * * * *